United States Patent [19]

Sieg

[11] Patent Number: 5,298,161
[45] Date of Patent: Mar. 29, 1994

[54] APPARATUS FOR CLEANING THE WORKING LIQUID OF AN EDM OR ECM MACHINE

[75] Inventor: Arno Sieg, Minusio, Switzerland

[73] Assignee: Erosonic AG, Wattwil, Switzerland

[21] Appl. No.: 924,026

[22] PCT Filed: Dec. 20, 1991

[86] PCT No.: PCT/CH91/00275

§ 371 Date: Nov. 5, 1992

§ 102(e) Date: Nov. 5, 1992

[87] PCT Pub. No.: WO92/11923

PCT Pub. Date: Jul. 23, 1992

[30] Foreign Application Priority Data

Jan. 7, 1991 [CH] Switzerland .................. 31/91

[51] Int. Cl.$^5$ .............................................. B01D 63/06
[52] U.S. Cl. ........................... 210/321.78; 210/321.87; 210/356; 210/388; 210/411; 210/427
[58] Field of Search ............. 210/393, 748, 258, 257.2, 210/321.78, 321.87, 354, 356, 388, 395, 411, 412, 425, 427

[56] References Cited

U.S. PATENT DOCUMENTS 5,039,347  8/1991  Hindström et al. ................ 210/393

FOREIGN PATENT DOCUMENTS 0245715  4/1987  European Pat. Off. .
0355633  8/1988  European Pat. Off. .
0321751  11/1988  European Pat. Off. .
0355632  2/1990  European Pat. Off. .
2449817  4/1975  Fed. Rep. of Germany .
3727275  2/1988  Fed. Rep. of Germany .
2063632  6/1971  France .
62-24917  7/1985  Japan .

OTHER PUBLICATIONS

Patent Abstracts, vol. 13, No. 211, May 17, 1989.
Patent Abstracts, vol. 10, No. 355, Nov. 29, 1986.
Patent Abstracts, vol. 15, No. 96, Mar. 7, 1991.
Patent Abstracts, vol. 3, No. 114, Sep. 21, 1979.

*Primary Examiner*—Frank Sever
*Attorney, Agent, or Firm*—Herbert Dubno

[57] ABSTRACT

The apparatus includes at least one membrane filter (32) for filtering a machining liquid which has been contaminated by its use in electroerosive or electrochemical machining of workpieces. The apparatus also includes a device for cyclical cleaning of the soiled membrane filter, which device irradiates the membrane filter (32) with ultrasonic waves (33) and loosens the contaminant particles in the filter pores as well as means (20, 23, 24, 25, 35, 36, 41) for the backwashing of the membrane filter and for removal of the contaminant particles. The contaminant particles are fed by means of throughflushing intervals from the concentrate chamber (30) into the sedementation vessel (12). As a result of this combination of ultrasound and backwashing, extremely small durations of the cleaning cycles and uniform cleaning of the complete filter area are insured without concern for the nonuniform contaminants topography of the filter surface resulting from the contaminants.

17 Claims, 3 Drawing Sheets

APPARATUS FOR CLEANING THE WORKING LIQUID OF AN EDM OR ECM MACHINE

CROSS REFERENCE TO RELATED APPLICATIONS

This application is a national phase of PCT/CH 91/00275 filed 20 Dec. 1991 and based, in turn, upon Swiss national application 31/91 of 7 Jan. 1991 under the International Convention.

The invention relates to an apparatus for cleaning a working liquid of an EDM or ECM machine. More particularly, the invention relates to an apparatus for the cleaning of a machining liquid of an electroerosive or electrochemical machining apparatus having a device for sedimenting contaminants from the liquid coming from a machining zone, a membrane filter for filtering the liquid, and a device for backwashing the filter.

The working liquid for electroerosive machining of workpieces (EDM) is, as is known, a dielectric with very low electrical conductivity, which in ram erosion by means of a shaped electrode [Die Sinking]is composed of hydrocarbons and in erosive cutting by means of wire electrodes is composed of deionized water. As the working liquid for electrchemical machining of workpieces (ECM) an electrolyte with higher electrolyte conductivity is provided which contacts the workpiece. The machining liquid used in both processes for the machining of the workpiece is passed in a continuous circulation. During the machining period, the purity and electrical conductivity of the machining liquid varies continuously with the increasing contamination which has an undesirable and disadvantageous influence on the machining process. Consequently, filters, either as cup filters or. membrane filters are introduced to always remove the contaminants arising as a consequence of the machining in the machining liquid. The cup filters formed as filter mats or filter cartridges have the disadvantage that during their operation, the filter characteristics vary in an uncontrolled manner. The contaminant particles filtered from the machining liquid block the pores so that the throughput of the filtered liquid is reduced. A backwashing of the cup filter to clean it is not possible so that contaminant particles penetrating into the pores cannot be removed. Consequently, in more recent times, membrane filters have been employed which can be freed from the contaminant particles by means of backwashing. The cleaning effect can be improved, therefore, because the contaminant particles can accumulate a number of times upon the membrane surface.

In printed Japanese application 62-24917, there is shown a membrane filter for an electroerosive machining apparatus which is arranged in a partial region of an ion and only filters a part the total machining liquid. The greater part of the machining liquid is filtered through a cup filter.

Printed European patent application 0321751 shows a filtering device for the precleaning of a contaminated machining liquid of an erosion machine by sedementation through treatment with a flockulating agent and then feeding to a tube-shaped membrane filter, wherein the greater part of the machining liquid flows past the filter wall unfiltered and only is employed to flush or clean the filter wall. The smaller proportion of the machining liquid passes perpendicularly through the membrane and is filtered. Over relatively short time intervals, the membrane filter is backwashed by means of the cleaned machining liquid to which compressed air is supplied and is cleaned. The newly contaminated liquid is fed again to the total filter process including precleaning and filtering. The cleaning effect is unsatisfactory because many parts of the membrane surface are backwashed nonuniformly which leads to a nonuniform distribution and penetration depth of contamination particles over the entire membrane surface. As a result an elevated backwashing pressure and a greater volume of the cleaned machining liquid is required for the backwashing. The increased backwashing pressure can be detrimental to the filter membrane. The greater volume of liquid required for the cleaning operation reduces the efficiency of filtering since this liquid, although already filtered once, must be returned to transverse the entire filter process again.

According to Printed European patent application 0355632 the identical tube shaped membrane filter is provided in a treatment apparatus for an electroerosion machine in such manner that the greatest part of the contaminated machining liquid, which can be designated conventionally as a concentrate, flows past the filter wall unfiltered and serves to breakup the contaminant cake built up on the filter wall. Only the smaller part of the machining liquid passes through the filter wall and is filtered. This small proportion of the machining liquid is conventionally designated as the permeate. As a result the unfiltered greater proportion, which is only used to flush the filter wall, has its flow direction cyclically reversed through the tubular membrane filter and consequently the contaminant cake, which builds up nonuniformly on the concentrate wide filter wall is removed from both sides of the filter tube. Furthermore, there is a cyclical backwashing through the filter material from the permeate side to the concentrate side with the aid of compressed air. The disadvantage of the backwashing is the same as that already described and briefly repeated here.

The elevated pressure, generated by means of compressed air, for effecting the backwashing requires a greater volume of permeate which then must be subjected to the total filter process including sedementation and filtering The efficiency of this known treatment apparatus is small because a significant proportion of the permeate is not used for its intended purpose, namely a clean machining liquid to be fed to the electroerosive process, but is employed for the backwashing of the filter. This known treatment apparatus utilizes cyclical control of the reversal of the flow direction of the proportion of the machining liquid used only for cleaning and backwashing of the filter material, is not only expensive and complicated, but diminishes the filter results since the intended filter process is interrupted with each backwash cycle and with rapid successions of the backwash cycles, may create a noticeable drawback.

Published European patent application 0355633 shows the same known treatment apparatus as has already been discussed. The reversal of the flow direction of the one and greater proportion of the contaminated machining liquid which flows unfiltered from one end to the other end of the tubular membrane filter, serves only for the cleaning of the filter surface at the concentrate side. The membrane filter is backflushed by means of compressed air. Additionally, a proportion of the machining liquid, which serves only for the cleaning of the concentrate side filter wall, is partly cleaned by means of a conventional, large-pore flow filter. The disadvantages are the same as those described above with this treatment apparatus.

OBJECT OF THE INVENTION

The invention has as its object not only to obviate the drawbacks of the conventional treatment apparatus for electroerosive machining apparatus, but also to produce further advantages.

SUMMARY OF THE INVENTION

The invention is provided therefore for electroerosive as well as for electrochemical machining apparatus. The invention reduces the backwash time requiring for backflushing requires only a very small volume of the machining liquid and therefore increases the efficiency of the treatment apparatus. It uses simple membrane filters and increases their lifespan. It is environmentally sound because practically no machining liquid which can be a dielectric or an electrolyte, is released into the environment and the contaminants or wastes of the electroerosive or electro-chemical machine of the workpiece are disposed of in solid form.

More particularly, according to the invention, the total flow of the machining liquid from the sedimenting or depositing device is supplied to at least one membrane filter subdivided into a concentrate chamber and a permeate chamber. At least one ultrasonic source is provided in the region of the membrane filter to remove contaminant particles which lodge in the membrane filter and are removed by the backwashing process.

Means is provided for throughrinsing of the concentrate chamber with machining liquid from the concentrate vessel at intervals. Further, a disposal means is provided for disposing of the contaminating particles separated from the machining liquid.

BRIEF DESCRIPTION OF THE DRAWING

The above and other objects features, and advantages will become more readily apparent from the following description, reference being made to the accompanying drawing in which.

Figure 1:
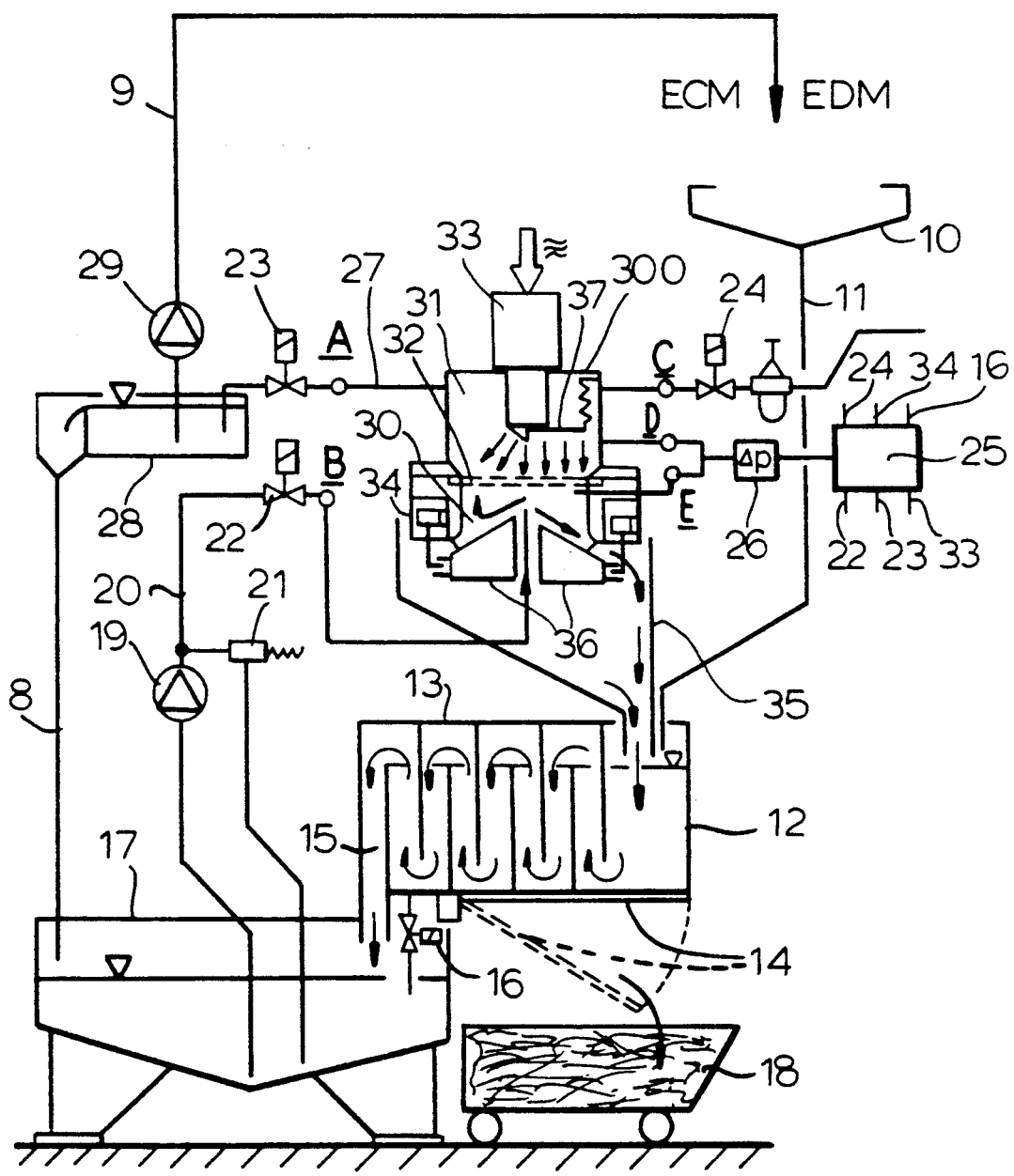
FIG. 1 is a flow diagram of the total cleaning apparatus in which a first embodiment of the filter unit is integrated.

The entire cleaning apparatus of FIG. 1 includes the working tank 10 shown only symbolically, in which the machining liquid is collected following contamination by the electroerosive cutting, sinking erosion or electrochemical machining. These machining methods cause known waste products in the machining liquid. Such waste products which are hereinafter characterized as contaminant particles, are comprised significantly of metal oxides of the metal or metals of the machining electrode and the metal or metals of the machined workpiece as well as combustion products in the particles size range of 0.2 µm to 0.5 mm.

The contaminated machining liquid collected in the working vessel 10 is led via line 11 into the four sided or rectangular sedimentation vessel 12 in which baffle walls 13 slow the flow of the working liquid in the downward direction by deflection so that the contaminant particles of the greatest weight deposit on the floor. It is also possible to so influence the contaminant particles by a magnetic field that these are deflected in the direction of the bottom of the sedementation vessel. The magnetic influence extends also to the particles of smaller weight and thus improves the sedimentation significantly. The precleaned liquid discharges via the outlet 15 from the sedimentation level 12 and passes into the concentrate vessel 17 The bottom 14 of the sedimentation vessel 12 can be removed for cleaning purposes. The baffle walls 13 are fastened on the nonillustrated side walls of the vessel or on its cover in order not to hinder the opening of flap 14.

The cleaning of the sedimentation vessel 12 is carried out with long time intervals or cycles. The flow of the working liquid from line 11 is blocked. The valve 16 is opened so that the liquid in the sedimentation vessel 12 can flow off into the concentrate vessel 17. The bottom 14 formed as a flap is opened as indicated in FIG. 1.

The collected contaminant cake on the bottom is discharged into a waste carriage 18. Since the contaminant cake holds only very little liquid, the volume to be deposited of is small so that the environmental loading for this system is significantly smaller than for a system with no cylindrical outline [horizontal projection]. In this case, circular baffle walls in the form of tubes concentrically arranged around a common center point are provided. The feed 11 of the working liquid is preferably effected ahead of the baffle wall or baffle tube with the largest diameter. The outlet 15 is located at the common center point. This circular embodiment of the sedimentation vessel has the same cross section as that illustrated in FIG. 1 except without the other arrangement of the outlet 15, the valve 16 and the bottom 14 formed as a flap. The sedimentation vessel can also be formed as an Archimedian spiral or even as a double spiral. The advantage of the sedementation vessel with circular cross section lies in its compact construction and results in space saving with maximally long flow paths.

The precleaned machining liquid is collected in concentrate vessel 17 and, as required, is delivered by a pump 19 via pipe 20 and open pipe 22 into the first filter unit illustrated in the embodiment of FIG. 1. The permissible pressure in the filter unit is set by the pressure valve 21.

The filter unit, which includes a concentrate chamber 30 and a permeate chamber 31 with one or more ultrasonic transmitters 33, which chambers are closed toward the exterior by a housing 300 and internally are connected with a membrane filter 32, is integrated via the connections A, B, C, D, E, in the entire cleaning apparatus. The filter unit can have any optimal cross section, for example, cylindrical, elliptical or polygonal cross section. This depends on the available room and the optimum filter area which from installation to installation location can vary. In FIG. 1 the filter unit has a housing 300 with a cylindrical cross section. The bottom 36 of the concentrate chamber 30 is so characterized that its two positions "closed" during the filter process and "open" during the recycling cycle are visible. During the normal filter process the valves 22 and 23 of connections A and B are open and valve 24 of connection C is closed, under the control of an electronic control device 25 described in greater detail subsequently. The concentrate flows via line 20 into the concentrate chamber 30, whose bottom 36 is closed and sealed via O-rings, by means of closure elements 34 of which only two are visible. Tests have shown that the feed in the center point of the bottom with hood-shaped distribution walls insures a uniform distribution of the concentrate and thus of the contaminant particles provided therewith in the entire concentrate chamber. The concentrate pressed through the membrane, fitter 32 results in the removal of the contaminant particles so that the machining liquid is completely purified as the permeate which enters the permeate chamber 31. The membrane filter 32, fastened and sealed between the two chambers 30 and 31 is composed of known material which can be obtained commercially and is supplied from many manufacturers under various commercial designations. The size of the filter surface is required. FIG. 1 shows only one ultrasonic source 33 whose irradiating surface 37 which is designated at the left half of FIG. 1 as the radiating surface and at the right half of the drawing as a radiating membrane, so extends into the permeate chamber 31 that the membrane filter 32 is ultrasonically radiated thereby. A plurality of ultrasonic sources can also be provided. The purpose and function of the ultrasonic sources will be later described in conjunction with the cleaning cycle of the membrane filter 32. The permeate passes via line 27 and open valve 23 into the permeate vessel 28 during the filter process, the permeate vessel 28 also being referred to as the clean tank. The pump 29 displaces the cleaned machining liquid via line 9 to the location of the electroerosive machining of workpieces by means of electrodes (EDM) or the electrochemical machining of workpieces without electrodes (ECM).

Thereafter, the machining liquid, contaminated by the machining, is collected in working vessel 10 and subjected again to circulation through the filtering system. This filter process can be repeated if desired. For the rare case in which the flow of the permeate in the permeate vessel 28 is greater than the discharge to the region of the machining, an overflow pipe 8 is provided. In the normal case, the flow and discharge quantities are matched with one another.

At spaced intervals, the membrane filter 32 is cleaned, whereby the impurities particles seated in the membrane pores are removed. Depending on the properties of the membrane filter 32 and the filter flow rate, between the concentrate chamber 30 and the permeate chamber 31 a pressure differential $\Delta p$ can arise and this pressure differential can be detected by a pressure sensor 26 between the connections D & E and supplied to the electronic control device 25. When the pressure difference $\Delta p$ reaches a permissible value for the material of the membrane filter, a cleaning cycle is initiated. The permissible value is supplied as a set point value in the control device corresponding to the filter material used and in which several programs for different cleaning cycles can be stored.

Each of the programs stored in a PROM component can have different parameters like ultrasonic frequencies, pressure buildup in chamber 31, backwashing, removal of the particles from chamber 30 of different durations. and different sequences of the features.

In the embodiment of FIG. 1, it is assumed that the duration for the total cleaning cycle will be 5 seconds. When the cleaning cycle begins as the pressure difference $\Delta p$ reaches the setpoint value, the control device 25 enables the shutting of valve 23 and the opening of valve 24 through whose controlled opening the required pressure in the permeate chamber 31 is built-up for the backflushing of the membrane filter 32 as generated by a fluid pressure medium, for example, compressed air. This pressure is somewhat smaller than the pressure generated by the pump 90 so that valve 32 remains open during the cleaning of the membrane filter 32.

The ultrasonic source 33 is set into operation then for about 4 seconds by the control device 25 and has its radiating membrane 37 trained upon the permeate side of the membrane filter 32. The ultrasonic waves cause the contaminant particles which have deposited during the filtering of the machining liquid in the membrane pores to loosen and leave the pores and then migrate into the concentrate chamber 30. The frequency range of the ultrasonic source 33 lies between 10 kHz and 2 MHz. The backwashing of the membrane filter 32 from the permeate chamber 31 into the concentrate chamber 30 commences after opening of the bottom 36. For this purpose the control device 25 actuates the closing element 34 which shifts the bottom 36 from the symbolically indicated closed position at the left hand side of the figure to the symbolically indicated open position at the right hand of the figure by about 2 mm. The bottom remains open for the program time determined by the control device 25 until the contaminants loosened and backwashed by the ultrasound enriches the contents of the concentrate chamber 30 and these contents have flown into the collecting vessel 35. In this time the concentrate chamber 30 sides itself in a flushing period with the aid of the pump 19 from the concentrate vessel 17. As a result of this feature the same concentrate of impurities are generated in the concentration chamber as in the concentration vessel 17.

In the embodiment illustrated in FIG. 1 the bottom 36 remains during the backwashed cycle and the rinse period open for 3 seconds. The control device 25 ends the ultrasonic irradiation by the ultrasonic source 33, closes the bottom via the closing element 34 and the valve 24, opens the valve 23. The filter process can begin again. Because of the 4 duration of the cleaning cycle, only 0.5 liter of the permeate of the machining liquid is necessary and is collected in the sediment vessel 12 and is not lost.

This combination of ultrasound and backwashing of the membrane reduces the backwash volume to a minimum and improve the efficiency of the total filter apparatus. The membrane filter receives, as a consequence, the original pore-deep cleanliness over its entire area. All of the membrane filter parameters return to the starting values so that within a large operating period of several months the machining liquid remains of the same quality so ,that in the total cleaning apparatus only the portion of evaporated machining liquid is to be replaced. A further advantage of the combination of ultrasound and backwashing is to be seen in that the total surface area of the membrane filter 32 is cleaned without any influence on the blockage topography of the filter surface. The blockage topography should be understood to be the lodging of the contaminant particles during the normal filtration in certain parts of the surface of the membrane filter whereas other surface parts have no or much less contaminant particles. The distinction of the surface parts which defines the blockage topography does not follow any law and differs from filter process to filter process. The backwashing without the use of ultrasound has practically no to minor effect upon stoppages with many contaminant particles depending upon the degree of stoppage while the other surface parts with fever contaminant particles permit the backflushing liquid to pass through very easily. To avoid this disadvantage during the conventional backwashing which does not recognize the use of ultrasound, pressure and volume of the backwashing liquid strongly increase to distort the membrane filter and reduce the efficiency $\eta$ summary.

$$\eta \% = \frac{\text{filtered Volume}}{\text{filtered Volume + Backwash Volume}} \times 100$$

With the combination of ultrasound and backwashing of the invention, the efficiency $\eta$ is improved because only a small backwash volume is required.

As has already been indicated previously, one or more ultrasonic sources 33, depending upon the size and shape of the surface of the membrane filter 32, can be arranged so that the total surface is uniformly irradiated and no dead spaces arise. The ultrasonic source 33 can be so controlled by the control device 25 that during the irradiation time provided the membrane filter is either continuously irradiated or is irradiated with pulses with a programmed repetition frequency. Further, the ultrasonic source 33 can be controlled by the control device 25 with a programmed timed sequencing so that an ultrasonic travelling wave irradiates the surface of the membrane 32. This will be explained further later in conjunction with other embodiments of FIGS. 2-5, whose figures only show the filter units which can be connected in the filtering cleaning apparatus at the connecting locations A, B, C, D, E.

Figure 2:
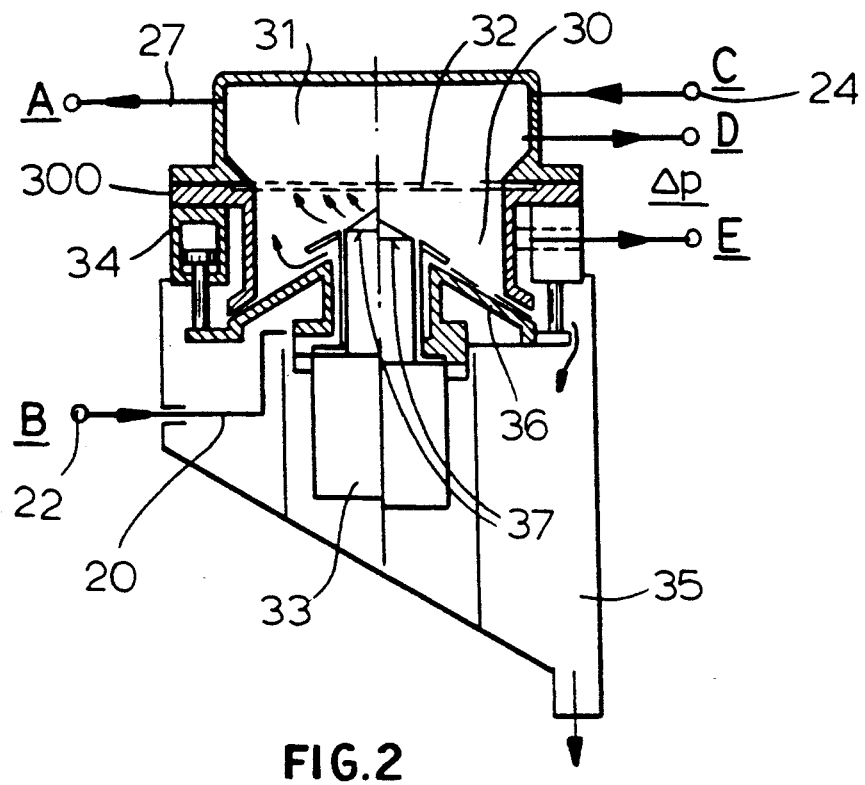
FIG. 2 is a view of a second embodiment of the filter unit, which can be introduced into the overall cleaning apparatus at the indicated connection locations.

FIG. 2 shows a filter unit in partial section whose construction corresponds to that of the filter unit of FIG. 1 with the exception that the ultrasonic source with its irradiating membrane 37 or its irradiating surface is built into the bottom 36 of the concentrate chamber 30. The membrane filter 32 is irradiated from the concentrate side in FIG. 2. The filtering function for the concentrate supplied via line 20 through the membrane filter 32 into the permeate chamber 31 and the discharge via line 27 into the permeate vessel 28 as well as the cleaning cycle of the membrane filter by ultrasound and backwashing and the throughflow interval for the concentrate chamber 30, including opening of the bottom 36 by means of the actuating element 34, for the discharge of the contaminant particles into the collecting vessel 35 have already been described in connection with FIG. 1. With respect to the embodiment of FIG. 2 it need only be said further that only one ultrasonic source 33 is provided which operates with a determined frequency. embodiment of the filter unit shown in FIG. 3 has a tubular membrane filter 32 and a special inlet of the concentrate via line 20 and a riser pipe 38 in the cylinder-shaped concentrate chamber 30, from which the outflow of the concentrate at the top in the concentrate chamber flows out and mixes well to deliver through the membrane filter 32. In the permeate chamber 31, which is also cylinder-shaped, the permeate collects and delivers via line 27 and collecting location A to the permeate vessel 28 for recovery of the filtered machining liquid. The two chambers and the bottom 36 are surrounded by housing 300.

Figure 3:
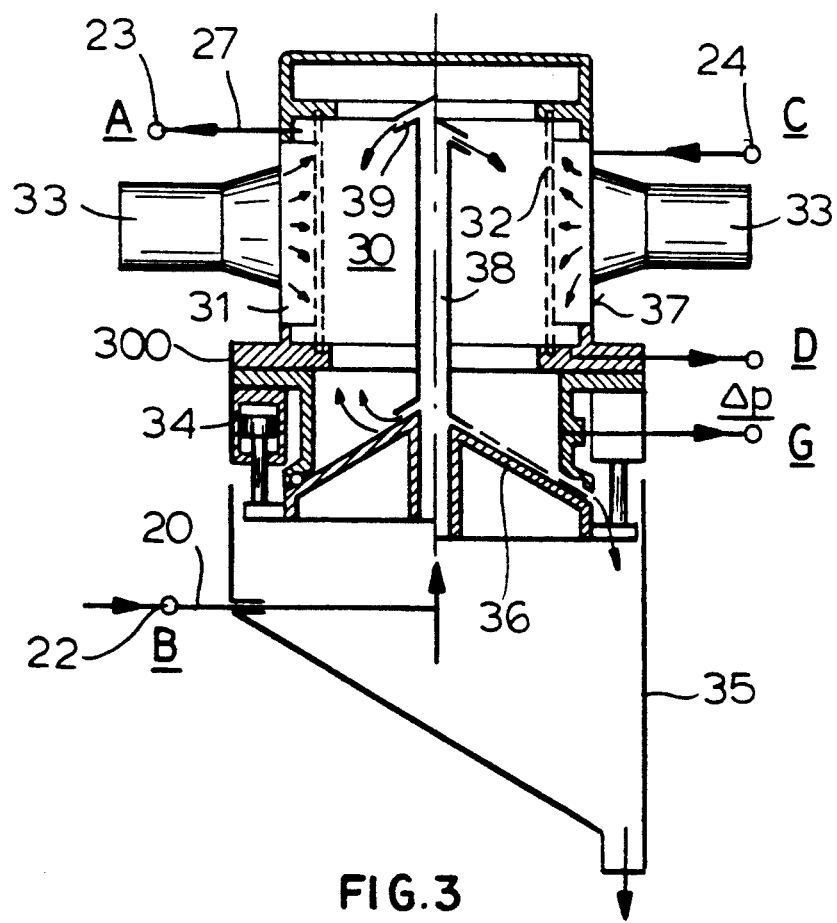
FIG. 3 is a sectional view of a third embodiment of the filter unit which is introduced into the total cleaning apparatus at the indicated connection locations.

At the outer periphery of this housing at the level of the permeate chamber 31 6 ultrasonic sources 33 are arranged with their radiating surface 5 37 in a ring around the permeate chamber so that they irradiate the permeate side of the filter 32 during the cleaning cycle and loosen the contaminant particles in the membrane pores. The controlled device 25 controls the cleaning cycle after the pressure difference $\Delta p$ between the concentrate chamber 30 and permeate chamber 31 reaches the predetermined setpoint for the filter unit of FIG. 3, the pressure difference being detected by the differential detector 26 and supplied to the control device. A cleaning cycle which is optimum for the filter unit of FIG. 3 is selected from the various cleaning cycles stored as programs in the control device 25. A program is chosen whose cleaning cycle is of a total of 12 seconds in duration with an irradiating time of 5 seconds, a backwashing time of 7 seconds and a throughrinsing time of 5 seconds, whereby the backwashing begins already during the irradiation via connection C, permeate chamber 31, membrane filter 32, concentrate chamber 30, open bottom 36, collecting vessel 3. The ultrasonic source 33 irradiates the permeate side of the membrane 32 with a frequency which lies in the range of 10 kHz to 2 MHz so that each of the ultrasonic sources is controlled by the control device with a predetermined phase shaft whereby a travelling wave arises which twists with a predetermined velocity along the tubular membrane filter 32. In this manner the membrane pores are cleaned still better and the material of the membrane filter is improved to enable a longer lifespan. The embodiment of FIG. 3 avoids so called dead sound spaces at the membrane filter 32 and this without concern as to the contamination topography of the membrane surface, so that optimum efficiency is assured. After the cleaning cycle the bottom 36 is closed by the closing element 34, valve 23 is opened and valve 24 is closed. The filter process begins again and continues until the next cleaning cycle.

Figure 4:
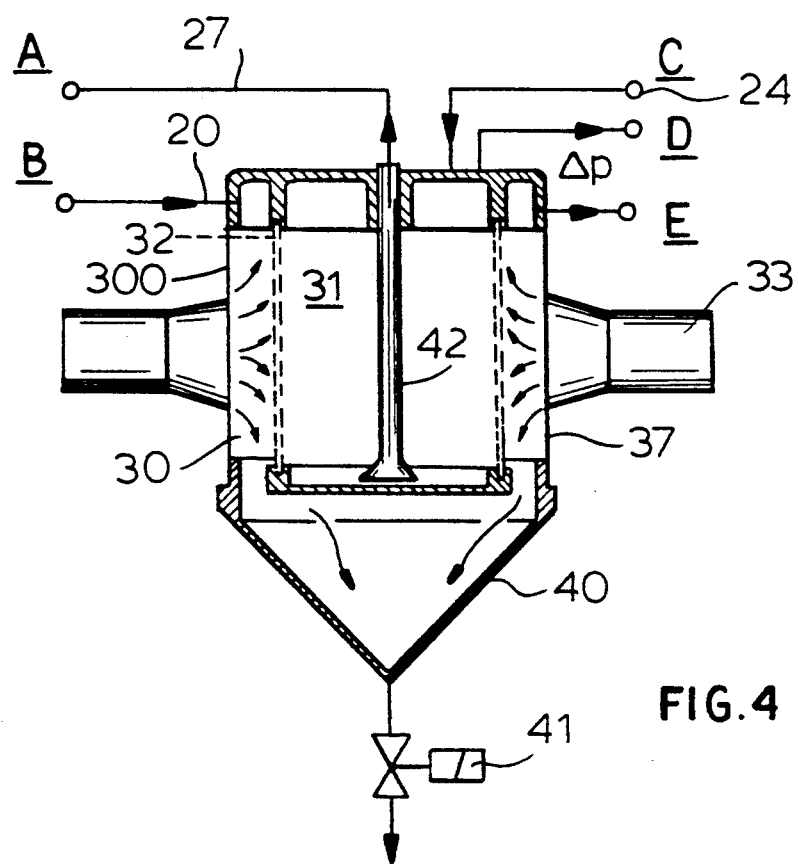
FIG. 4 is a sectional illustration of a fourth embodiment of the filter unit introduced into the overall cleaning apparatus at the indicated connection locations.

FIG. 4 shows a fourth embodiment of a filter unit which is integrated into the cleaning apparatus at the connecting locations A, B, C, D, E. The filter unit contains cylindrically shaped concentrate and permeate chambers 30, 31 which are separated by a tubular member 32. The said chambers are in a housing 300. The concentrate flows via the open valve 23, connection B, line 20 into the cylindrically shaped concentrate chamber 30 and fills the lower compartment 40 on the lower most location of which a valve 41 is provided with a discharge 35 into the sedimentation vessel 12. The valve 41 is closed during filtering.

The concentrate found in the concentrate chamber 30 is pressed through the membrane filter 32 and loses the last of the contaminating particles. As the permeate, it enters the permeate chamber 31 and flows via the riser pipe 42, connection A, valve 23 into the cleaning tank 28. The cleaning cycle begins when the pressure difference $\Delta p$ reaches the setpoint value. The control device closes valve 23 and opens The ultrasonic sources 33 are arranged with their irradiating surface 27 in a given number around the concentrate chamber 30 in the form of a ring and irradiate the concentrate side of the filter 32 during the cleaning cycle. It is assumed that the cleaning cycle will have a total time of 14 seconds, the irradiation a duration of 5 seconds, the backwashing a duration of 7 seconds, the throughrinsing time a duration of 5 seconds, whereby the ultrasonic sources 33 irradiate the concentrate side of the membrane filter 32 with pulses. In accordance with a predetermined irradiation pattern, pulse groups each of 10 pulses per second which are separated from one another by 0.5 seconds. The contaminant particle flow via the open vale 41 into the sedimentation vessel 12.

Figure 5:
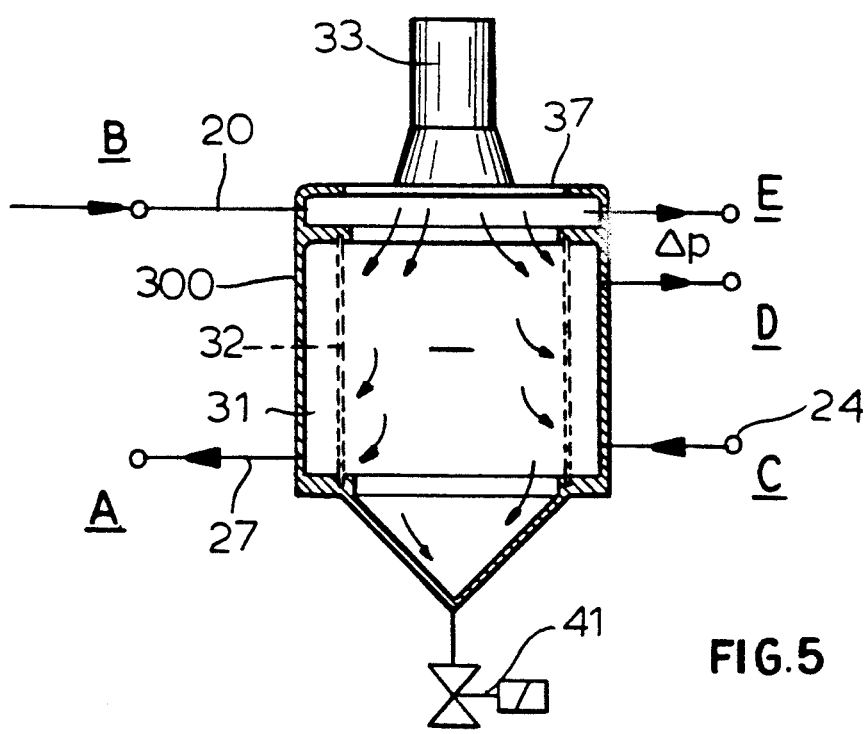
FIG. 5 is a section through a fifth embodiment of the filter unit inserted in the overall cleaning apparatus at the indicated connection locations.

The filter unit shown in FIG. 5 indicates a cylindrical embodiment in which the concentrate chamber 30 is surrounded by a cylindrical shaped membrane 32. The permeate chamber 31 surrounds the membrane filter. Both chambers are provided in the housing 300. Via the connection B, the concentrate flows through line 20 into the concentrate chamber, is press through the membrane filter and loses all of its contaminant particles at the latter. The permeate collected in the permeate chamber 31 is carried off via line 27, connection A of the housing 300 of the filter unit and flows into the cleaning tank 28. The cleaning cycle which is started after the value Δp is reached, which value is predetermined based upon the material and surface area of the membrane filter 32, is comprised of a combination of ultrasound and backwashing. FIG. 5 illustrates the ultrasonic source 33 and its radiating membrane 37 which radiate side of filter 32 quasitangentially. Such quasitangential main direction is not critical, since the ultrasound, as a consequence of its spherical wave front, also irradiates the contaminant particles of the entire filter surface uniformly. With the cylindrically shaped membrane filter, a single ultrasonic source at the cylinder axis should be sufficient with another, shapes of the membrane filter (as for example an elliptical or polygonal) shape two or more ultrasonic sources are required for uniform irradiation of the filter surface. In the fifth embodiment the membrane filter 32 of FIG. 5 has an irradiation time of 4 seconds with a continuous frequency of for example 400 kHz and a backwash time of 6 seconds whereby the valve 24 opens to initiate backwashing one second earlier than the ultrasonic irradiation begins. The valve 41 controls the throughflushing interval.

The discussion of the five embodiments with respect to FIGS. 1-5 indicates that the irradiation of the membrane filter 32 with ultrasound can improve each of the cleaning cycles so that shorter periods are required for the cycles and loner intervals between the cycles can be provided. In addition, dead sound spaces at the surfaces of the membrane filter are avoided. Through these features the efficiency is significantly increased. The filter units are so constructed that they can be built into existing apparatuses. The construction of the filter units is simple so that their outer dimensions and shapes (cylindrical, elliptical or polygonal can be matched to the respective spacial accommodations. It is possible to insert two or more filter units in the overall apparatus as the location and operating conditions may require.

I claim:

1. An apparatus comprising: means for cleaning a machining liquid of an electroerosive or electrochemical machining device, including,
    a device for sedimenting contaminants from the machining liquid, said sedimenting device having a liquid entrance and a liquid exit;
    a filter unit comprising a housing that is subdivided by a stationary membrane filter into a concentrate chamber and a permeate chamber;
    a pump for supplying fluid from the liquid exit of the sedimenting device to the concentrate chamber;
    a conduit for supplying liquid from the permeate chamber to the machining device, said conduit containing a shut off valve;
    a collecting means for collecting the liquid from the machining device, said collecting means being connected with said liquid entrance of said sedimenting device;
    a pressure means connected with said permeate chamber for backwashing said membrane filter;
    means for selectively connecting said concentrate chamber with said liquid entrance of said sedimenting device during backwashing of said membrane filter; and
    an ultrasonic vibrator mounted on said filter unit, said vibrator having a radiating surface submerged in the liquid for vibrating said membrane filter, said pump being dimensioned so that, during filtering, an entire output flow of said pump is passed through said membrane filter.

2. The apparatus according to claim 1 wherein said membrane filter is tubular.

3. The apparatus according to claim 2 wherein a plurality of ultrasonic vibrators are mounted on said housing surrounding said membrane filter.

4. The apparatus according to claim 1 wherein said membrane filter is disc shaped.

5. The apparatus according to claim 1 wherein a pressure difference sensor is connected to said concentrate chamber and said permeate chamber for controlling the time intervals between backwashing cycles.

6. The apparatus according to claim 1 wherein a bottom portion of said concentrate chamber is inclined towards said means for selectively connecting said concentrate chamber with said liquid entrance of said sedimenting device.

7. The apparatus according to claim 1 wherein a bottom portion of said concentrate chamber is displaceable between an upper closed position and a lower position in which a gap is formed between said bottom portion and a side wall of said concentrate chamber.

8. The apparatus according to claim 1 wherein said sedimenting device contains baffle walls.

9. The apparatus according to claim 1 wherein a bottom part of said sedimenting device is movable between an upper closed position and a lower position for removing sedimented particles form said sedimenting device.

10. A filter unit comprising: means for cleaning machining liquid of an electroerosive or electrochemical machining device, including,
    a housing
    a stationary membrane filter subdividing said housing into a concentrate chamber and a permeate chamber;
    a supply connection for supplying contaminated liquid to said concentrate chamber;
    an output connection on said permeate chamber for supplying clean liquid to said machining device;
    a pressure means connected to said permeate chamber for selectively backwashing liquid from said permeate chamber through said membrane filter into said concentrate chamber;
    a flushing means for flushing said concentrate chamber; and an ultrasonic vibrator mounted on said housing and having a radiating surface submerged in said liquid for vibrating said membrane filter.

11. The filter unit according to claim 10 wherein said membrane filter is tubular.

12. The filter unit according to claim 11 wherein a plurality of ultrasonic vibrators are mounted on said housing surrounding said membrane filter.

13. The filter unit according to claim 10 wherein said membrane filter is disc shaped.

14. The filter unit according to claim 10 wherein a pressure difference sensor is connected to said concentrate chamber and said permeate chamber for controlling the time intervals between backwashing cycles.

15. The filter unit according to claim 10 wherein a bottom portion of said concentrate chamber is inclined towards said flushing means.

16. The filter unit according to claim 10 wherein a bottom portion of said concentrate chamber is displaceable between an upper closed position and a lower position in which a gap is formed between said bottom portion and a side wall of said concentrate chamber.

17. The filter unit according to claim 15 wherein the bottom portion of said concentrate chamber is funnel shaped and leads to an outlet passage that contains a valve.

* * * * *